United States Patent
Rajda et al.

(10) Patent No.: US 7,514,907 B2
(45) Date of Patent: Apr. 7, 2009

(54) DEVICE, SYSTEM, AND METHOD FOR PROVIDING A LOW-VOLTAGE FAULT RIDE-THROUGH FOR A WIND GENERATOR FARM

(75) Inventors: Janos Rajda, Mississauga (CA); Anthony William Galbraith, Kilbride (CA); Colin David Schauder, Murrysville, PA (US)

(73) Assignee: Satcon Technology Corporation, Boston, MA (US)

( * ) Notice: Subject to any disclaimer, the term of this patent is extended or adjusted under 35 U.S.C. 154(b) by 63 days.

(21) Appl. No.: 11/439,892

(22) Filed: May 24, 2006

(65) Prior Publication Data

US 2006/0267560 A1    Nov. 30, 2006

Related U.S. Application Data

(60) Provisional application No. 60/684,416, filed on May 24, 2005.

(51) Int. Cl.
*G05F 1/70* (2006.01)
*G05F 3/00* (2006.01)
*G05F 5/00* (2006.01)

(52) U.S. Cl. .............. 323/205; 323/208; 323/209; 323/266; 323/210

(58) Field of Classification Search .......... 323/205, 323/208, 209, 266, 210
See application file for complete search history.

(56) References Cited

U.S. PATENT DOCUMENTS

| | | | |
|---|---|---|---|
| 4,686,447 A | 8/1987 | Takeda et al. | 323/210 |
| 4,719,402 A | 1/1988 | Brennen et al. | 323/211 |
| 4,891,570 A | 1/1990 | Nakamura et al. | 323/210 |
| 4,954,765 A * | 9/1990 | Hu | 323/217 |
| 4,967,347 A | 10/1990 | Smith et al. | |
| RE33,521 E | 1/1991 | Mori et al. | |
| 4,998,194 A | 3/1991 | Okamoto et al. | |
| 5,034,669 A * | 7/1991 | Sako et al. | 318/376 |
| 5,093,630 A | 3/1992 | Sato | 323/210 |
| 5,157,574 A * | 10/1992 | Tuusa | 361/56 |
| 5,187,427 A | 2/1993 | Erdman | 323/207 |
| 5,402,058 A | 3/1995 | Larsen | 323/211 |
| 5,465,202 A * | 11/1995 | Ibori et al. | 363/37 |
| 5,485,075 A | 1/1996 | Mori et al. | 323/207 |
| 5,548,203 A | 8/1996 | Kemerer et al. | 323/210 |
| 5,570,007 A | 10/1996 | Larsen | 323/209 |
| 5,631,545 A | 5/1997 | Norman et al. | 323/205 |
| 5,635,872 A * | 6/1997 | Zimmerman | 330/128 |
| 6,107,785 A | 8/2000 | Griffiths | 323/209 |
| 6,118,676 A * | 9/2000 | Divan et al. | 363/34 |
| 6,137,277 A | 10/2000 | Rajda et al. | 323/301 |
| 6,198,329 B1 | 3/2001 | Ezell et al. | |
| 6,274,851 B1 | 8/2001 | Mulcahy et al. | 219/501 |

* cited by examiner

*Primary Examiner*—Bao Q Vu
(74) *Attorney, Agent, or Firm*—Weingarten, Schurgin, Gagnebin & Lebovici LLP

(57) ABSTRACT

A device, a system, and a method for preventing power-producing wind turbine generators from tripping due to the detection of a low-voltage condition on a power grid are disclosed. The disclosed device includes a resistor bank that absorbs real power and a control system that maintains the collector bus voltage above a threshold voltage level during the duration of low-voltage condition on the power grid. Collector bus voltage is maintained using gating signals that include phase delay angles to adjust the opening/closing of the switching devices.

26 Claims, 6 Drawing Sheets

DEVICE, SYSTEM, AND METHOD FOR PROVIDING A LOW-VOLTAGE FAULT RIDE-THROUGH FOR A WIND GENERATOR FARM

CROSS REFERENCE TO RELATED APPLICATIONS

This application claims the benefit of U.S. provisional patent application No. 60/684,416 filed on May 24, 2005, which is incorporated herein in its entirety by reference.

BACKGROUND OF THE INVENTION

The present invention generally relates to a device, a system, and a method for controlling the voltage on a wind farm collector bus during and after a low-voltage or grid fault occurrence on a utility power grid, to prevent the wind turbine generators from tripping and disconnecting from the power grid.

There has been an increasing interest in non-fossil fuel energy sources as a consequence of the escalating cost and political ramifications associated with a reliance on foreign oil. Wind turbine generators ("WTGs") are one such energy source. WTGs offer the further benefit of providing an environmentally-friendly, non-polluting energy source.

WTGs are controlled current sources that normally deliver current at approximately unity power factor. WTGs rely on wind force to rotate a plurality of turbine blades. The turbine blades are coupled to the rotor assembly of a generator. As the turbine blades rotate, a plurality of windings on the rotor assembly induces current to flow in a plurality of windings on a stator. The current can be converted and phased as necessary and the voltage may be stepped-up, e.g., using a transformer, to produce electrical power at a desired voltage.

Although individual, isolated WTGs may be erected to service a small number of customers, typically, WTGs are structured and arranged in groups or "farms" that are electrically coupled to a collector bus to provide power to a utility power grid for a multitude of customers.

For the greatest efficiency and for maximum power output, it is desirable that the WTGs operate within about ±10 percent of their rated, or nominal, operating voltage capacity, i.e., between about 90% and about 110%. However, during operation, if the WTG controller senses that the voltage on the collector bus is below a threshold voltage, e.g., about 70 to 85% of the nominal operating voltage, the controller is designed to disconnect the generator from the grid to protect the WTG generators.

Although it is important to disconnect the WTG from the power grid to protect the WTG from a fault condition on the power grid, when a WTG disconnects from the power grid, it may take several minutes to go through a restart cycle and come back on line. During this restart time, the WTGs are not available as a power source. As a result, a transient voltage sag in the utility power grid, in the range of milliseconds, could cause a complete shutdown of an entire wind farm power source for several minutes.

The Federal Energy Regulatory Commission ("FERC") has proposed minimum requirements for wind plant response to low-voltage conditions on a utility power grid. FIG. 1, shows the FERC's proposed minimum required wind plant response curve with respect to time.

Prior to a grid fault, e.g., at time minus one second ($t_{-1}$), each WTG should be operating at ±10% of nominal capacity (Point A). When a low-voltage grid fault occurs (at $t_0$), the voltage at the high side of the wind farm transformer can decrease instantaneously by as much as 90 percent, e.g., from 100 percent to about 10 percent of its nominal operating voltage (Point B TO Point C). When such a voltage drop occurs on the collector bus, the FERC mandates that the WTGs in the wind farm be able to ride-through the low-voltage condition for at least 625 milliseconds (POINT D). After about 625 milliseconds, power from the WTGs should again be deliverable, i.e., brought on line, to the utility power grid (Point E) and power should be fully restored from the WTGs within three (3) seconds of the occurrence of the fault at $t_0$. The voltage at Point E will be at least 90% of the nominal operating voltage capacity of the WTGs.

Thus, it would be desirable to provide a device, a system, and a method that complies with the low-voltage fault ride-through requirements established for WTGs by the FERC minimum. It would further be desirable to provide a device, a system, and a method for providing a low-voltage fault ride-through that includes a control system that prevents the WTGs from disconnecting from the utility power grid during the ride-through period.

SUMMARY OF THE INVENTION

In accordance with the present invention, a system and a method are disclosed for use with a wind turbine generator (WTG) for controlling the voltage on a WTG collector bus that is electrically-coupled to a utility power grid. More specifically, the voltage is controlled to maintain a minimum voltage on the controller bus when a low-voltage, grid fault condition on the power grid is detected. The disclosed system and method prevent WTGs that are electrically-coupled to the collector bus from disconnecting from the power grid and thereby avoids the substantial restart time that is associated with such an event.

The system includes a controller and a controllable resistance coupled between the collector bus and the power grid.

In one embodiment, a plurality of AC switching devices and a resistor bank are connected in parallel between the collector bus and the power grid. Each of the switches is rated to carry the full collector bus current for all or some portion of each phase and, further, to withstand some portion of the difference in voltage between the collector bus voltage and the voltage at the input to the step-up transformer coupled to the power grid. The resistor bank comprises at least one resistor. The resistor(s) is/are rated to carry the full phase voltage for a short period of time, e.g., the time needed to correct the low-voltage, grid fault occurrence on the utility grid. The resistor bank absorbs real power during the low-voltage, grid fault occurrence and produces a voltage that keeps the collector bus voltage above a threshold voltage level.

One embodiment of the presently disclosed system includes a plurality of AC switches, e.g., a silicon controlled rectifier or any other suitable controllable AC switching device that are arranged in multiple levels (to prevent damage from excessive voltage) and in such a way so that gating signals from the controller are applied to the switching devices simultaneously to specify the average current through the resistive element.

In this embodiment, the controller provides gating signals to each of the plurality of AC switches. Moreover, the controller provides gating signals having phase delay angles ranging between zero degrees and 180 degrees every half-cycle. The controller establishes an average current for every half-cycle.

When a low-voltage condition is detected on the power grid, the controller activates each of the AC switches to close the switches for a first portion of the half-cycle and to open the switches for a second portion of the half-cycle or vice versa.

For each half-cycle, the controller establishes an average current so as to maintain the collector bus voltage above a threshold level. When the AC switches are all closed, the full collector bus current passes through the AC switches for that portion of the half-cycle. When the AC switches are all open, the full collector bus current passes through the resistor bank for that portion of the half-cycle. The average collector bus current through the resistor bank is a function of the ON time for the at AC switches.

In another embodiment, a resistor bank is coupled between the collector bus and the power grid. The resistor bank comprises a plurality of resistors that are connected in parallel between the collector bus and the power grid. Switches are provided in series with each of the resistors so that each of the resistors can separately be included or excluded between the collector bus and the power grid under the control of the controller. Each of the resistors is rated to carry the full phase voltage for a short period of time, e.g., the time needed to correct the low-voltage, grid fault occurrence on the utility grid. In this embodiment, the resistors having corresponding switches closed define the equivalent resistance of the resistor bank at any given time. The resistor bank absorbs real power from the collector bus during the low-voltage, grid fault occurrence. The controller establishes the equivalent resistance of the resistor bank to maintain the voltage on the collector bus above a predetermined threshold voltage at which the WTGs disconnect from the power grid. In this embodiment, an AC switch is further provided in parallel with the resistor bank. When the AC switch is closed, current generated by the WTGs primarily passes through the AC switch to the power grid. The AC switch is closed during normal operation when the WTGs are providing current to the power grid. The AC switch may comprise silicon controlled rectifiers ("SCRs"), triacs or any other suitable controllable AC switching device.

When a low-voltage condition is detected on the power grid, the AC switch is opened and the collector bus is electrically coupled to the power grid through the resistor bank. The controller activates the switches coupled in series with the resistors to specify the equivalent resistance of the resistor bank based at least in part on the voltage appearing on the power grid. Each resistor in the resistor bank is rated to carry the full controller bus current continuously for each phase.

In yet another embodiment, a plurality of resistive modules are cascaded in series between the collector bus and the power grid. Each resistive module includes a resistor and an AC switch connected in parallel. Each AC switch in the series-connective resistive modules can be controlled by the controller to pass AC current in a closed state, or, alternatively, to be open, in which case the collector bus current passes through the corresponding parallel connected resistor in the respective resistive module. The equivalent resistance for the cascaded resistive modules thus generally corresponds to the sum of the resistance of the resistors in resistive modules for which the respective AC switches are open.

A method is also disclosed for controlling the collector bus voltage for a plurality of wind turbine generators when a grid fault or low-voltage occurrence on a power grid is detected so as to prevent the WTGs from disconnecting from the power grid. The method includes providing a low-voltage fault ride-through device and a control system (described above); measuring voltage levels on the collector bus and the power grid; and controlling a variable resistance coupled between the collector bus and the power grid to maintain the voltage on the collector bus above a predetermined threshold voltage.

The present invention further provides a control device for controlling the LVRT and a computer readable software program or alternative algorithm for doing the same.

BRIEF DESCRIPTION OF THE DRAWINGS

The invention will be better understood by reference to the following Detailed Description of the Invention in conjunction with the accompanying drawings of which.

DETAILED DESCRIPTION OF THE INVENTION

A low-voltage fault ride-through ("LVRT") system is disclosed. The LVRT device is structured and arranged to prevent wind turbine generators in a wind farm or other doubly-fed induction machines ("DFIM"), from disconnecting from a utility power grid during transient low-voltage, grid fault occurrences on the power grid. For convenience, the system will be described for the case of a single-phase-to-ground system. The system, however, is equally applicable to two- and three-phase-to-ground systems as well as to one-, two-, and three-phase line-to-line systems. The presently disclosed system will also be described as applied to DFIM wind turbine generators, however, those of ordinary skill in the art will appreciate the general applicability of the system to all kinds of induction motors and wind turbine generators.

Figure 1:
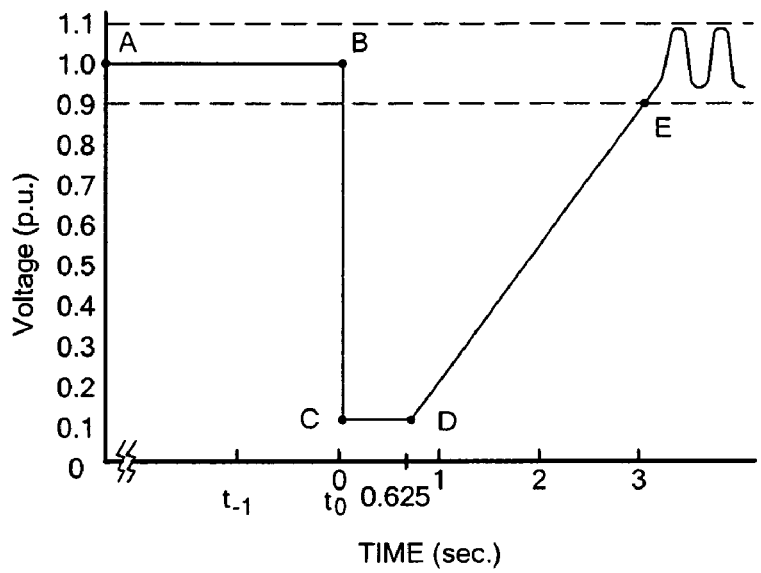
FIG. 1 is a graphical representation of the FERC's minimum required wind plant response to a low voltage condition.
Figure 2:
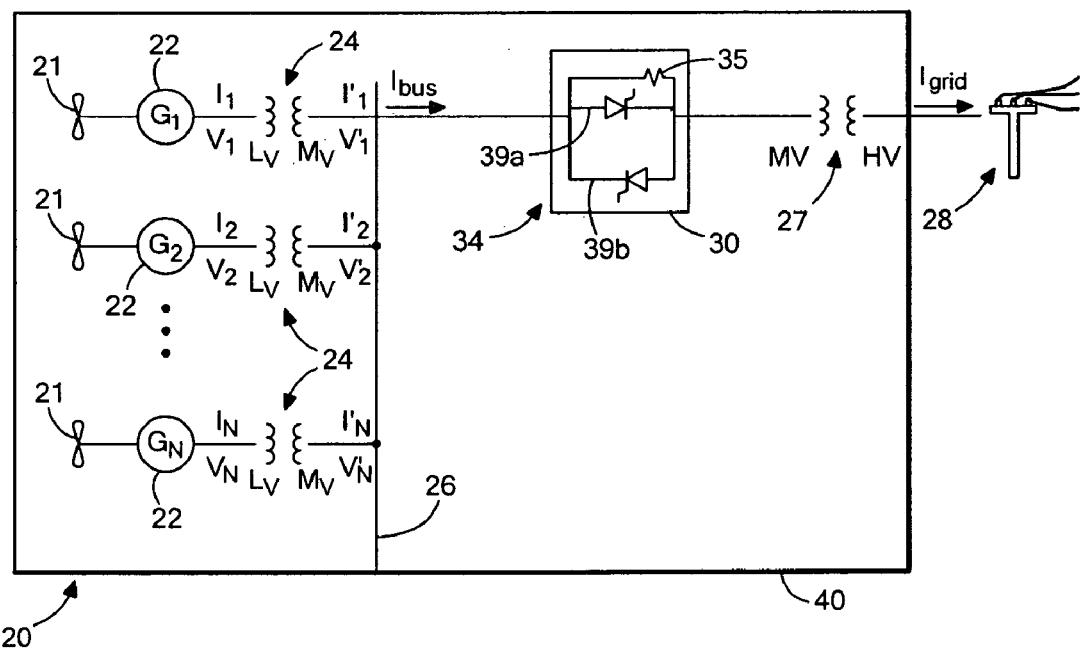
FIG. 2 is a diagrammatic representation of a wind turbine generator farm in accordance with the present invention.

Referring to FIG. 2, there is shown a diagram of a system 40 in accordance with the present invention. The system 40 includes a current source 20, e.g., a plurality of wind turbine generators 22 ("WTGs" or "generators"), a load, i.e., a utility power grid 28, and a controllable resistive device, i.e., an LVRT device 30, interposed between the current source 20 and the power grid 28.

Shown are a plurality of WTGs 22, labeled $G_1, G_2, \ldots G_N$ respectively (where n is a positive integer). The generators 22, collectively, make up a wind farm. As is known in the art, the wind-driven rotation of a plurality of turbine blades 21 coupled to the WTGs 22 produces a current $(I_1, I_2, \ldots I_N)$.

Rotation of the turbine blades 21 produces rotation of a rotor assembly (not shown) of the associated generator 22. The rotor assembly includes a first plurality of windings (not shown), i.e., rotor windings, that is aligned with a second plurality of windings (not shown) of a stator assembly (not shown), i.e., stator windings. As the rotor assembly and the rotor windings rotate, current ($I_1, I_2, \ldots I_N$) is induced in the stator windings.

Current ($I_1, I_2, \ldots I_N$) induced in the stator windings is, typically, of a low-voltage. The relatively low, generator terminal voltages ($V_1, V_2, \ldots V_N$) associated with the currents ($I_1, I_2, \ldots I_N$) can be stepped-up to a higher voltage level, e.g., using a step-up, boost or buck transformer 24 on each phase. Specifically, the low voltages ($V_1, V_2, \ldots V_N$) are stepped-up to voltages ($V'_1, V'_2, \ldots V'_N$) between about 10 and about 35 kilovolts ("kV"), having associated currents ($I'_1, I'_2, \ldots I'_N$), respectively. The operation and function of such transformers 24 are known in the art.

The current ($I'_1, I'_2, \ldots I'_N$) from each of the WTGs 22 in the wind farm is collected on a sub-station collector bus 26. The current on the collector bus ($I_{BUS}$) is delivered to a utility power grid 28 through the LVRT device 30 as is further discussed below.

Typically, utility power grids 28 are multi-phase alternating current ("AC") voltage sources that supply power to consumers. Transmission voltage levels range, typically, between "high", e.g., about 115 kV, and "ultra-high", e.g., about 1000 kV. Higher voltage levels are desirable because of, for example, transmission line distances and capacities, reduced line losses, small line-voltage drops, and the like.

Accordingly, before delivery to the power grid 28, the voltage on the collector bus 26 ($V_{BUS}$) is stepped-up to a higher voltage, i.e., a grid normal operating voltage ($V_{GRID}$) between about 115 kV and about 230 kV, e.g., using a step-up, boost or buck transformer 27 on each phase.

As illustrated in FIG. 2, the LVRT device 30 is interposed between the collector bus 26 and the utility power grid 28. The LVRT device 30 compensates for occasional and unpredictable voltage losses or voltage sags that may occur on the power grid 28, so as to prevent the WTGs 22 from disconnecting from the power grid 28. The LVRT device 30 provides a variable resistance, or effective total resistance, that can be controlled to maintain the collector bus voltage level ($V_{BUS}$) above a threshold voltage level ($V_{Th}$), e.g., about 70% to about 85% of the nominal operating voltage capacity. Furthermore, the resistive element of the LVRT device 30 absorb real power generated by the WTGs 22.

This arrangement allows each WTG 22 to continue to generate power irrespective of the transient low-voltage condition on the power grid 28. Essentially, during a transient low-voltage condition on the power grid 28, at least one AC switch 39 that is in parallel with a resistor bank 35 can be opened so that the collector bus current ($I_{BUS}$) is diverted through the resistor bank 35 where resistors 35a to 35n (and/or other impedance devices) absorb real power. As a consequence of the diversion of the collector bus current ($I_{BUS}$) through the resistor bank 35, the LVRT device 30 maintains the collector bus voltage level ($V_{BUS}$) above the threshold voltage level ($V_{Th}$). More particularly, the LVRT device 30 maintains the collector bus voltage level ($V_{BUS}$) above the voltage level at which the WTGs 22 would otherwise disconnect from the utility power grid 28.

Figure 3:
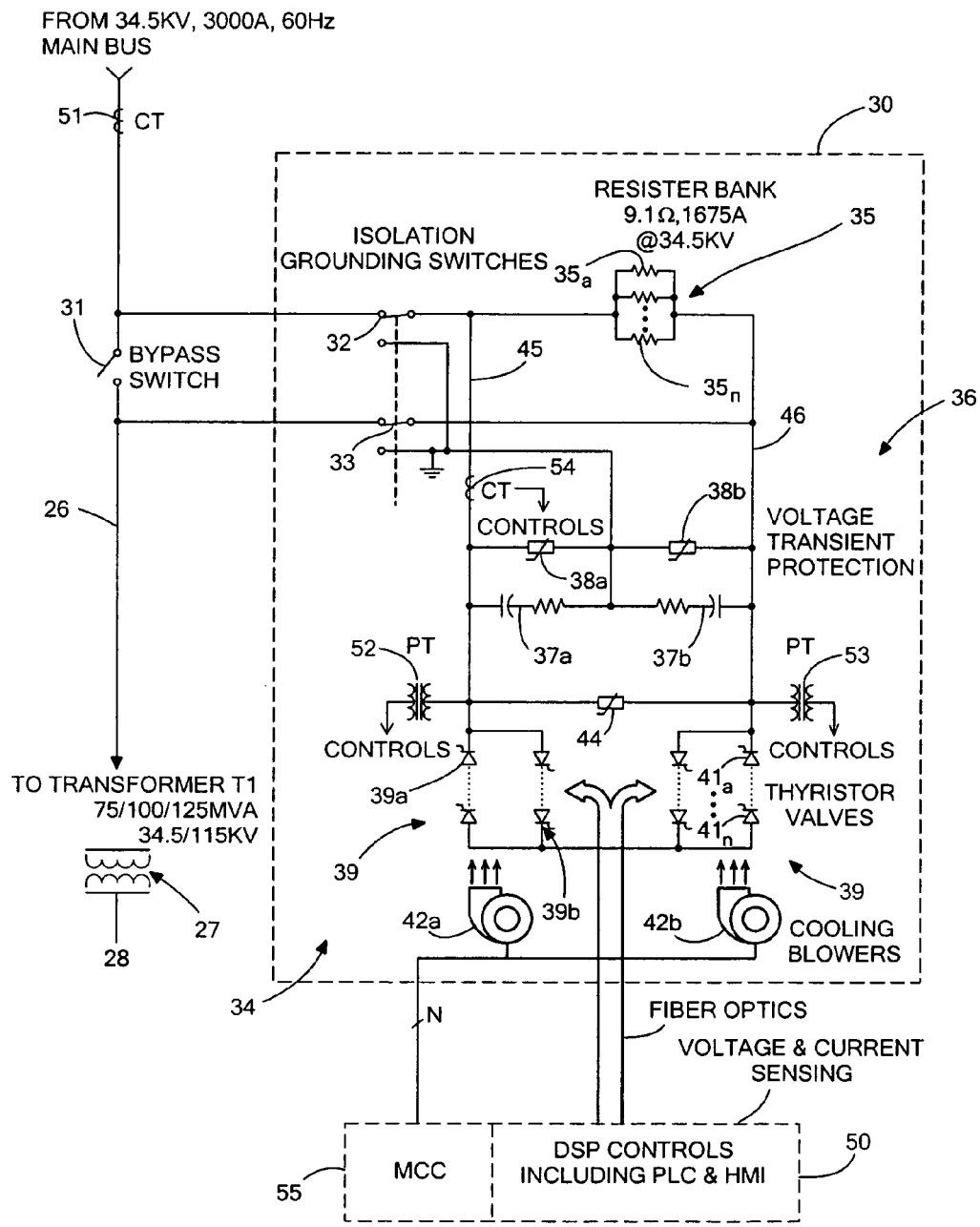
FIG. 3 is a diagram of a low-voltage fault ride-through device in accordance with the present invention.

The LVRT device 30 is illustrated with greater particularity in FIG. 3. The LVRT device 30 includes a resistive element or resistor bank 35, a voltage control system 34, and a controller 50. The voltage control system 34 includes at least one AC switching device 39 that can be independently controlled. The AC switching devices 39 shown in FIG. 3 are thyristors such as silicon-controlled rectifiers ("SCRs"); although, any suitable AC switching devices 39 may be employed. The composition and function of SCRs are well known in the art and will not be described in detail.

A first thyristor string 39a includes at least one SCR 41a to 41n. Moreover, the cathode portions of all of the SCRs 41a to 41n in the first string 39a are oriented in the same direction or have the same polarity.

A second thyristor string 39b includes at least one SCR 41a to 41n; however, the number of SCRs 41a to 41n in the second string 39b equals the number of SCRs 41a to 41n in the first string 39a. The cathode portions of all of the SCRs 41a to 41n in the second string 39b are oriented in the same direction and have the same polarity. However, the direction of the cathode portions or polarity of the SCRs 41a to 41n of the second string 39b are opposite the direction of the cathode portions or polarity of the SCRs 41a to 41n of the first string 39a.

Each SCR 41a to 41n in both parallel strings 39a and 39b is rated to carry the full collector bus current ($I_{BUS}$) for all or some portion of each phase. Furthermore, each SCR 41a to 41n in both parallel strings 39a and 39b is rated to withstand a portion of the voltage between the collector bus and the input of the step-up transformer 27. Accordingly, when the SCRs 41a to 41n are open, none or virtually none of the current passes through the SCRs 41a to 41n.

The resistive element 35 comprises a plurality of resistors (and/or other impedance devices), labeled 35a to 35n. The resistors 35a to 35n in the resistive element 35 are structured and arranged in parallel, between the collector bus 26 and the step-up transformer 27 coupled to the power grid 28. Each of the resistors 35a to 35n is rated to carry the full phase voltage for a short period of time, e.g., the time needed to correct the low-voltage, grid fault occurrence on the power grid 28. The resistor bank 35 absorbs real power during the low-voltage, grid fault occurrence.

The controller 50 controls the opening and closing of the components of the switching device 39. Specifically, the controller 50 uses gating signals transmitted to the AC switching devices 39 to control the various components. When the AC switching device 39 is closed, collector bus current ($I_{BUS}$) passes through the switching device 39. When the AC switching device is open, collector bus current ($I_{BUS}$) passes through the resistor bank 35.

Figure 6A:
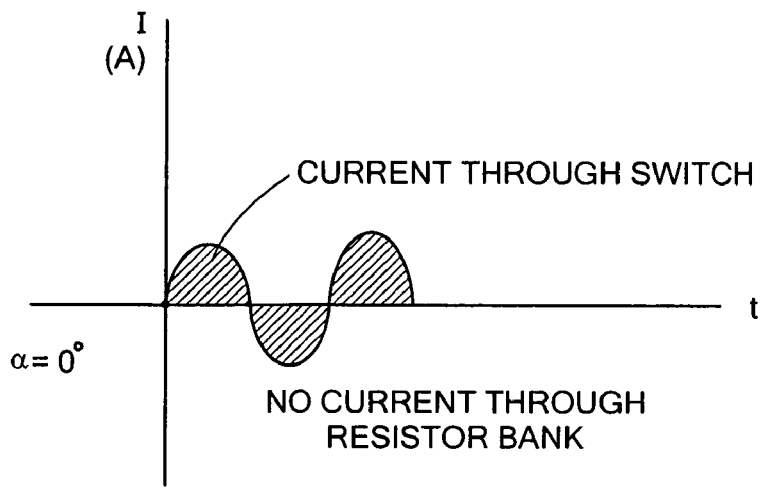
FIG. 6A is a diagram depicting collector bus current passing through the AC switch at a gating signal with a zero-phase delay angle.
Figure 6B:
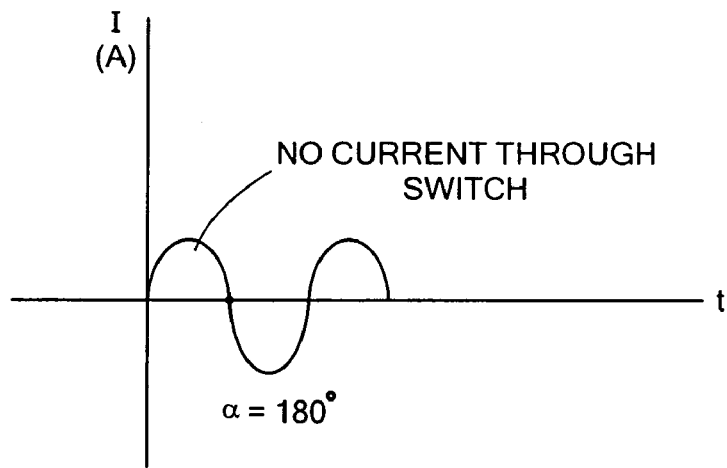
FIG. 6B is a diagram depicting collector bus current passing through the AC switch at a gating signal with a 180-degree phase delay angle.

The controller 50 conveys gating signals, e.g., every half-cycle, that include phase delay angles that range between zero degrees and 180 degrees. The effects of gating signals with various phase delay angles ($\alpha$) are shown illustratively in FIGS. 6A through 6C.

A gating signal with a zero-phase delay angle (FIG. 6A) closes the AC switching device 39, resulting in the delivery of all or virtually all of the controller bus current ($I_{BUS}$) to the power grid 28 through the AC switches 39. Negligible current is delivered to the power grid 28 through the resistor bank 35. Hence, there is negligible real power absorbed by the resistors 35a to 35n in the resistor bank 35.

A gating signal with a 180-degree phase delay angle (FIG. 6B), on the other hand, opens the AC switching device 39, resulting in the delivery of all or virtually all of the collector bus current ($I_{BUS}$) to the power grid 28 through the resistor bank 35. While all or virtually all of the collector bus current ($I_{BUS}$) is delivered through the resistor bank 35, the controller 50 can maintain the voltage level ($V_{BUS}$) on the collector bus 26 above the threshold level ($V_{Th}$) by varying the effective total resistance of the resistor bank 35 to provide the necessary voltage. Alternatively, the controller 50 can maintain the voltage level ($V_{BUS}$) on the collector bus 26 above the threshold level ($V_{Th}$) by varying the average current delivered to the resistor bank 35 to provide the necessary average voltage.

A gating signal with a phase delay angle between 0 and 180 degrees (FIG. 6C), will result in the delivery of current ($I_{BUS}$) to the power grid 28 through resistor bank 35 during a first portion of the half-cycle 61 and delivery of current ($I_{BUS}$) to the power grid 28 through the AC switches 39 during the remaining, or second, portion of the half-cycle 62. The amount of collector bus current ($I_{BUS}$) delivered through the AC switches 39 and through the resistor bank 35 during each half-cycle depends on the magnitude of phase delay angle ($\alpha$).

During normal operating conditions, the controller 50 transmits gating signals with a zero-degree phase delay angle ($\alpha = 0$) at or near the beginning of every half-cycle. As discussed above and as shown in FIG. 6A, all of the collector bus current ($I_{BUS}$) is delivered to the power grid 28 through the switching devices 39.

When a low-voltage condition on the power grid 28 is detected by voltage measurements on the collector bus 26, the controller 50 conveys gating signals to the switching devices at or near the beginning of each half cycle. The gating signals include a phase delay angle greater than zero degrees and less than or equal to 180 degrees. The phase delay angle depends on the relationship between the collector bus voltage and the threshold nominal voltage output level.

Figure 6C:
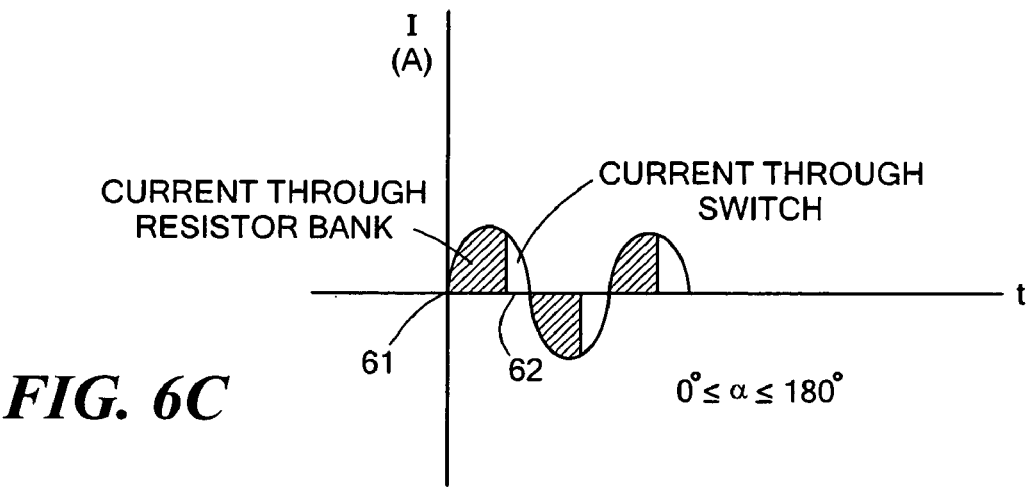
FIG. 6C is a diagram depicting collector bus current passing through the AC switch at a gating signal having a phase delay angle between 0 degrees and 180 degrees.

The gating signals activate each of the AC switches 39 simultaneously to remain closed (or remain open if originally open) for a first portion of the half-cycle 61 and to open (or close) for a second portion of the half-cycle 62 as shown in FIG. 6C.

Accordingly, for each half-cycle, the controller 50 provides an average voltage that is the result of an average current passing through the resistance value of the resistor bank 35. The controller 50 ensures that the average voltage is sufficiently high to maintain the collector bus voltage above the threshold level. For example, for a phase-delay angle or 45 degrees (or Π/4), the switching devices 39 are open about 25 percent of the half-cycle.

Figure 5A:
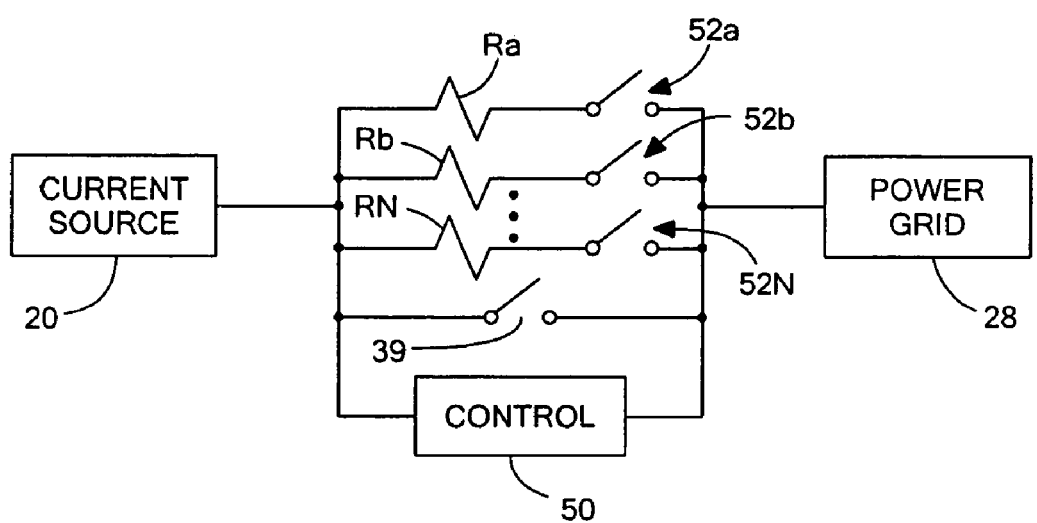
FIG. 5A is a diagram of another embodiment of a low-voltage ride through device having controllable resistors in parallel in accordance with the present invention.

In another embodiment, which is shown in FIG. 5A, the LVRT device 30 includes a resistor bank 35 in parallel with an AC switching device 39. In this embodiment, the resistor bank 35 includes plural parallel resistors 35a to 35n (and/or other impedance device). A resistor line switch, labeled 52a to 52n, is provided in series with each of the resistors 35a to 35n, between the collector bus 26 and the input to the step-up transformer 27. As a result, each of the resistors 35a to 35n can separately be included or excluded from the effective total resistance under the control of the controller 50.

Resistor line switches 52a to 52n are either opened or closed to define the equivalent resistance or effective total resistance, of the resistor bank 35 at any given time. Consistent with Ohm's Law, those resistors 35a to 35n, whose associated line switch 52a to 52n is closed while the AC switching device 39 is open, absorb real power and maintain the collector bus voltage ($V_{BUS}$) above the threshold voltage level ($V_{Th}$) during the low-voltage, grid fault occurrence. The controller 50 establishes the equivalent resistance of the resistor bank 35 to maintain the voltage on the collector bus ($V_{BUS}$) above a predetermined threshold voltage ($V_{Th}$) at which the WTGs 22 disconnect from the power grid 28.

The controller 50 associated with this embodiment is structured and arranged to provide gating signals having phase delay angles at every half-cycle to the AC switching device 39 and, when the AC switching device 39 is open, to the resistor line switches. A zero-phase delay angle closes the switching device for the half-cycle. A 180-degree phase delay angle opens the switching device for the half-cycle. A phase delay angle between zero and 180 degrees will open the switching device for a first portion of the half-cycle and will close the switching device for the remaining portion of the half-cycle. For ease of controlling the variable resistance, gating signals to the AC switching device 39 and to all but one of the resistor line switch 52a to 52n associated with each resistor 35a to 35n can be either zero-degree or 180-degree signals while the gating signal to one of the associated resistor line switch 52a to 52n can include a phase delay angle between zero degrees and 180 degrees.

Figure 5B:
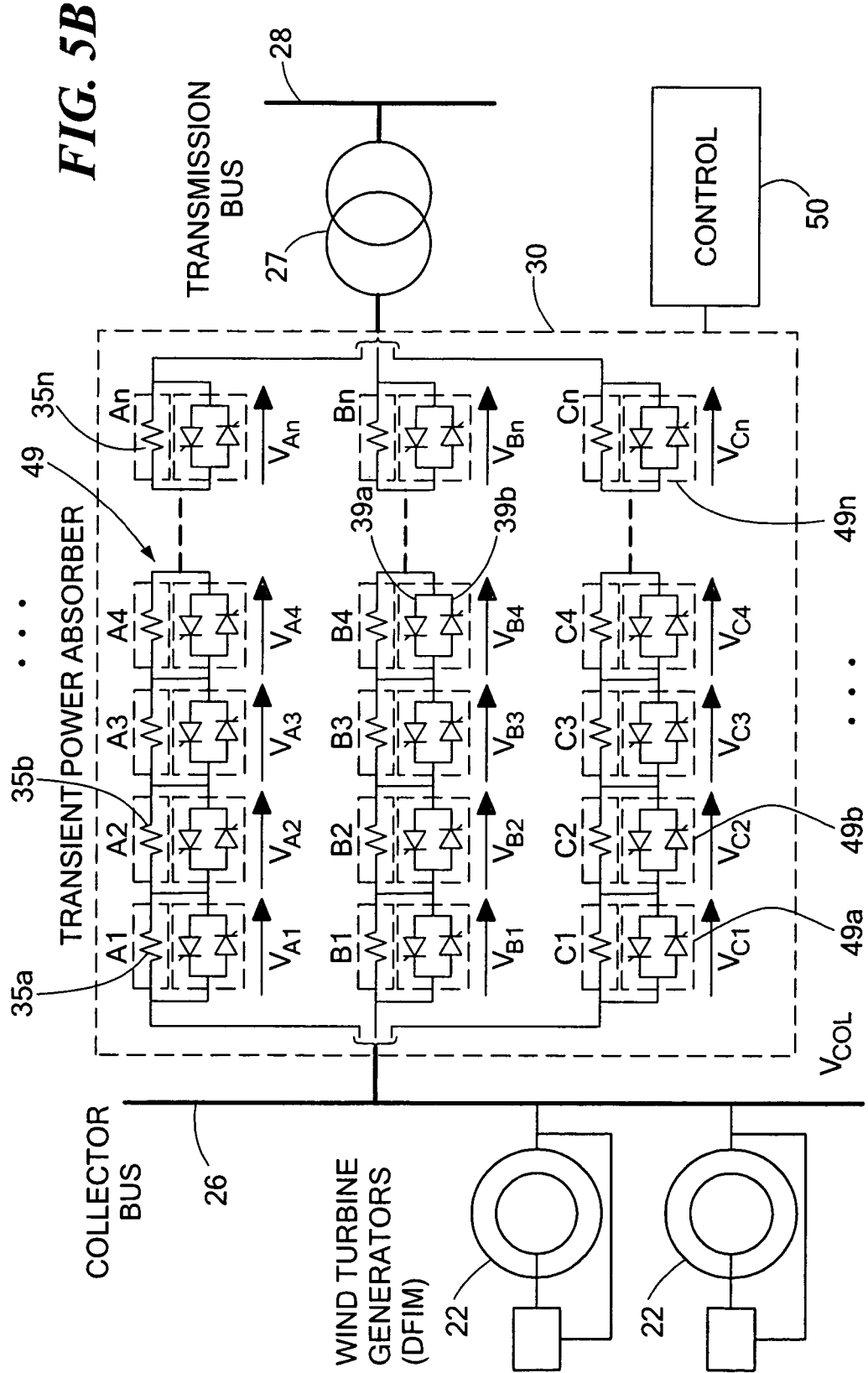
FIG. 5B is a diagram of yet another embodiment of a low-voltage ride through device having cascading, or in-series, voltage control modules in accordance with the present invention.

In yet another embodiment, which is shown in FIG. 5B, the LVRT device 30 includes a plurality of resistive modules, labeled 49a to 49n, that are cascaded in series between the collector bus 26 and the step-up transformer 27 coupled to the power grid 28 for each phase (A, B, and C). Each resistive module 49 includes a resistor 35a to 35n and an associated AC switching device 39a to 39n connected in parallel. Each resistor 35a to 35n is rated to carry the full voltage output for each phase (A, B, and C) and, furthermore, for short periods of time, to carry the full current for each phase (A, B, and C).

The resistance value of each resistive module 49 may vary or may be the same. However, the resistance value of each resistive module 49 is selected so that the effective total resistance of the plural resistive modules 49a to 49n is sufficient to maintain the collector bus voltage ($V_{BUS}$) at or above the threshold voltage level ($V_{Th}$). Thus, resistors 35a to 35n having different resistance values in one or more resistive modules 49 can be selectively by-passed in order to control the effective total resistance for each phase (A, B, and C).

Each AC switching device 39 in the series-connective resistive modules 49, is also controlled by the controller 50 using gating signals, and, more particularly, using gating signals having selected phase delay angles. The controller 50 associated with the second embodiment is also structured and arranged to provide gating signals having phase delay angles at every half-cycle to the AC switching devices 39a to 39n. A zero-phase delay angle closes the switching device for the half-cycle. A 180-degree phase delay angle opens the switching device for the half-cycle. A phase delay angle between zero and 180 degrees will close the switching device for a first portion of the half-cycle and will open the switching device for the remaining portion of the half-cycle. For ease of providing a controllable, variable resistance, gating signals to all but one of the AC switching device 39a to 39n can be either zero-degree or 180-degree signals while the gating signal to the remaining switching device can include a phase delay angle between zero and 180 degrees.

Having described alternative embodiments of an LVRT device 30, additional, common structure for the same will now be described. Referring to FIG. 3, a pair of transformers 52 and 53 is structured and arranged to monitor operating conditions on the collector bus 26. The pair of transformers 52 and 53 monitors voltage levels on the collector bus ($V_{BUS}$) and transmits continuous voltage level signals to the controller 50. In one arrangement, the first transformer 52 is disposed on a first connection line 45 leading to the AC switching device 39 and the second transformer 53 is disposed on a second connection line 46 leading out of the AC switching device 39.

The controller 50 receives voltage level signals from the transformers 52 and 53 and compares voltage levels ($V_{BUS}$) with a nominal, or rated, operating voltages ($V_{Th}$). Based on the results of the comparison, the controller 50 transmits gating signals, e.g., every half-cycle, to the AC switching device(s) 39 and/or the resistor line switches 52a to 52n. The gating signals include phase delay angles to vary the timing of opening/closing the AC switching device(s) 39 and/or the resistor line switches 52a to 52n.

For example, a low-voltage condition occurs on the power grid 28, the low-voltage interruption can last for a fraction of a second or much longer. As the grid voltage drops, the voltage on the collector bus ($V_{BUS}$) also drops in the absence of further control. The transformers 52 and 53 detect the voltage sag on the collector bus 26 and convey voltage signals to the controller 50.

The controller 50 receives the voltage signals from the transformers 52 and 53 compares them to the threshold voltage level ($V_{Th}$). Based on the results of the comparison, the control system 50 transmits, e.g., every half-cycle, new gating signals to the AC switching device(s) 39 and/or the resistor line switches 52a to 52n.

Current ($I_{BUS}$) re-routing through the resistor bank 35 continues until the fault is cleared, e.g., by flashover or by transmission system protection devices (not shown), or as long as necessary, to maintain the collector bus voltage ($V_{BUS}$) above the threshold tripping voltage ($V_{Th}$). Thus, the resistive element 35 provides a short-term, active power dump for generated wind power during which the voltage on the collector bus ($V_{BUS}$) is maintained above the WTG threshold voltage ($V_{Th}$) until the grid fault occurrence has been corrected or cleared.

The LVRT device 30 also includes a transient voltage protection system 36 to protect the voltage control system 34 from over-voltages. The transient voltage protection system 36 is disposed in parallel with the resistor bank 35. The transient voltage protection system 36 comprises one or more RC (resistor-capacitor) components, or snubber circuits, 37a and 37b and/or one or more arrestors 38a and 38b. Snubber circuits 37a and 37b are well known in the art. As shown in the FIG. 3, one terminal of each RC component 37a and 37b is grounded and the other terminal is electrically coupled to the first or second connections 45 or 46, respectively.

Arrestors 38a and 38b also are well known in the art. Arrestors 38a and 38b are disposed in parallel with the AC switching device 34. As shown in the FIG. 3, one terminal of each arrestor 38a and 38b is grounded and the other terminal of each arrestor 38a and 38b is electrically coupled to the first or second connections 45 or 46, respectively. This configuration protects the voltage control system 34 and resistor bank 35 from an over-current condition that could damage the resistors 35a to 35n or thyristors 39a and 39b by providing a current by-pass.

Optionally, an arrestor 44 can be disposed between the first connection 45 and the second connection 46. This arrestor 44 also protects the AC switching devices 39 by providing still another by-pass in parallel with the AC switching devices 39, reducing the voltage being delivered to the AC switching devices 39. Thus, when the voltage across the connections 45 and 46 becomes too great, current can be directed to by-pass the AC switching devices 39 via the arrestor 44 before it damages the switches or resistors.

The LVRT device 30 also includes at least one current sensor 51 and 54. Current sensors 51 are well-known in the art and will not be discussed in any great detail herein. Current sensors 51 and 54 protect the resistors 35a in the resistor bank 35 and the AC switching devices 39 from damage. At least one current sensor 51 can be provided on the collector bus 26 and at least one current sensor 54 can be provided on one or both of the connections 45 or 46. When a multiple-phase system is used, current sensors 51 can be coupled to each of the phase lines. Although FIG. 3 only shows a single current sensor 51, more sensors 51 could be used, e.g., to provide redundancy.

Current sensors 51 and 54 continuously measure current levels on the collector bus 26 and either or both of the connections 45 and 46 and provide current level indications to the controller 50. The controller 50 compares these current level measurements to maximum allowable current levels ($I_{max}$). Based on the relationship between measured current levels and allowable current levels, the controller 50 provides appropriate gating signals to the AC switching devices 39a to 39n and/or resistor line switches 52a to 52n, e.g., every half-cycle, to reduce current levels.

The LVRT system also includes one or more cooling devices 42, e.g., cooling blowers 42a and 42b, to cool the AC switching devices 39 and the resistor bank 35. The controller 50 includes a programmable logic controller ("PLC") that controls a motor control center 55 ("MCC"). The MCC 55 includes means, e.g., switches, circuits, breakers, relays, and the like, to control power delivery to the coolers 42a and 42b and also to protect the blower motors (not shown) from damage by overload.

During normal operating conditions of the power grid 28, the cooling devices 42 may be in an OFF state because heat generated by the current passing through the AC switching devices 39 is negligible. However, during low-voltage fault ride-through operating conditions, current passes through the resistors 35a to 35n. The resistors 35a to 35n absorb real power, which generates a great deal of heat. Accordingly, during these instances of high heat generation, the controller 50 can signal the MCC 55 to activate one or more of the cooling devices 42.

At least one temperature sensor (not shown) provides temperature measurement signals to the controller 50 and/or the MCC 55. When the temperature measurement signals reach or exceed a pre-determined operating temperature level, the MCC 55 can activate at least one cooling devices 42. When the temperature measurement signals fall below the pre-determined operating temperature level, the MCC 55 can de-activate the cooling device(s). Optionally, the functions of the MCC 55 can be performed by the controller 50 without requiring a separate microprocessor.

The system 40 can also include a bypass switch 31 and isolation grounding switches 32 and 33 to isolate the LVRT device 30 from the collector bus 26, e.g., when maintenance or repair of the LVRT device 30 is required. Preferably, these switches 31, 32, and 33 are mechanical switches that can be manually activated and de-activated.

Optionally, the LVRT device 30 can include a harmonic filter (not shown) to filter harmonic disturbances and artifacts to improve performance.

Advantageously, because the collector bus voltage for each phase is independently controllable, the controller 50 can be structured and arranged to provide balanced voltages on the collector bus 26 in each phase during an unbalanced low-voltage, grid fault occurrence on the power grid 28.

Control software, e.g., a control algorithm, that is executable on an electronic device will now be described in the context of a method for providing a low-voltage fault ride-through. The control software includes executable code that is readable by an electronic device, e.g., a processor. Thus, the control software includes program code operative in accordance with the following method steps.

Figure 4:
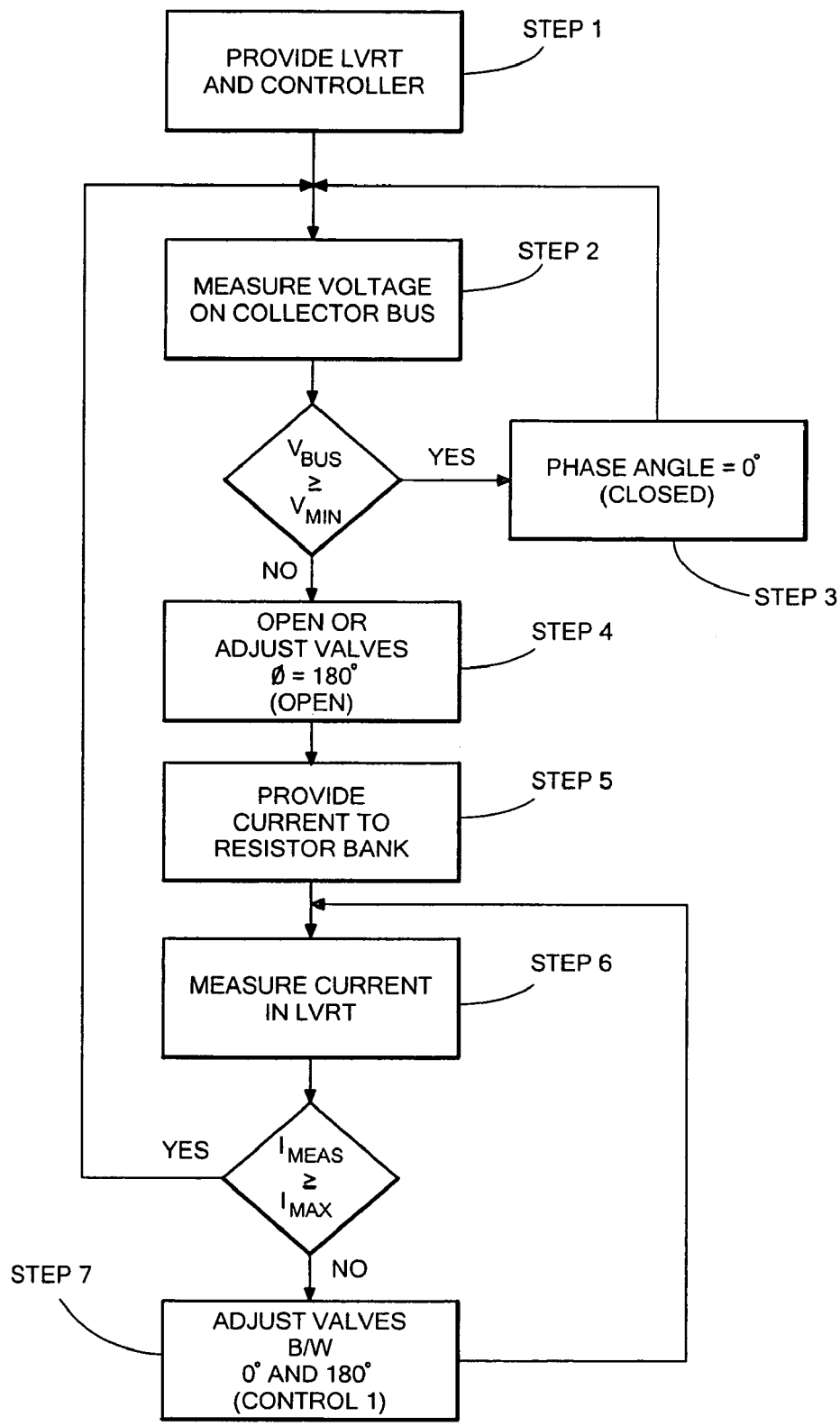
FIG. 4 is a flow chart of a method of providing a low-voltage fault ride-through for a wind generator turbine farm in accordance with the present invention.

Referring to FIG. 4, an LVRT device (described above) is interposed between the collector bus of a WTG farm and the transmission bus of a utility power grid (STEP 1). Transformers monitor the voltage levels on the collector bus and/or on the utility power grid, providing continuous voltage level indications to the controller of the LVRT device (STEP 2). These data are provided to the controller as continuous, digital data or, alternatively, as analog data that can be converted to digital data by the control system itself or by a separate analog/digital ("A/D") converter provided for that purpose.

To ascertain whether or not a low-voltage, grid fault occurrence, e.g., ground fault, grid failure, voltage sag, and the like, has occurred on the power grid, the controller compares the received, digitized voltage level data to a predetermined threshold voltage level ($V_{Th}$), e.g., that has been stored in memory.

If the measured voltage of the collector bus ($V_{BUS}$) is greater than or equal to the predetermined threshold voltage level ($V_{Th}$), the controller conveys gating signals, e.g., every half-cycle, to appropriate AC switching devices (STEP 3). More particularly, the gating signals include a phase delay angle of zero degrees to close the AC switching device so that collector bus current passes through the AC switching device to the power grid.

When the measured collector bus voltage ($V_{BUS}$) nears the predetermined threshold voltage ($V_{Th}$), a low-voltage, grid fault condition likely exists. Consequently, the controller conveys gating signals, e.g., every half-cycle, to appropriate AC switching devices and/or resistor line switches (STEP 4). More particularly, the gating signals include phase degree angles between zero and 180 degrees, to open or close each AC switching devices and/or resistor line switches (STEP 4) to provide a desired effective total resistance. As a result, current produced by the WTGs is delivered to the power grid through the resistor bank (STEP 5), where the effective total resistance maintains the voltage on the collector bus at or above the threshold voltage level.

Current levels in the LVRT system are continuously measured (STEP 6), including during grid fault occurrences. Current level data are provided to the controller as continuous, digital data or, alternatively, as analog data that are converted or convertible to digital data by the control system or by a separate analog/digital ("A/D") converter provided for that purpose. The controller compares current level data to a predetermined allowable current level ($I_{MAX}$).

If the measured current ($I_{MEAS}$) is less than the predetermined maximum allowable current ($I_{MAX}$), then the controller makes no significant adjustments to the AC switching devices and/or resistor line switches. However, if the measured current is greater than or equal to the maximum allowable current ($I_{MAX}$), then the controller conveys gating signals to the voltage control system to adjust the AC switching devices and/or resistor line switches until the current is below the maximum allowable current limit (STEP 7).

Gating signals will include a phase delay angle that is between zero and 180 degrees. Incremental phase angle increases or decreases, e.g., by 10 degrees, by 15 degrees, by 20 degrees, etc., are desirable. This ensures that, incrementally, more current flows through the AC switching devices and less current flows through the resistor bank.

Although preferred embodiments of the invention have been described using specific terms, such descriptions are for illustrative purposes only, and it is to be understood that changes and variations may be made without departing from the spirit or scope of the following claims.

What I claim is:

1. A device for controlling voltage on a collector bus in operational association with at least one wind turbine generator having an output with at least one phase, the device comprising:
    a controllable resistance that is disposed between the collector bus and a load of each phase of the output, the controllable resistance including:
        a controllable resistor bank to provide a variable resistance, wherein the resistor bank is structured and arranged to absorb real power generated by the at least one wind turbine generator when a voltage drop or a voltage sag occurs on the load and to maintain the voltage on the collector bus at or above a predetermined threshold voltage level, and
        at least one switching device in parallel with the controllable resistor bank, that passes collector bus current to the load when closed and that diverts collector bus current to the resistor bank when open; and
    a controller that is structured and arranged to receive current level and voltage level data and, based on current level and voltage level data, to provide gating signals to open or close the at least one switching device, to adjust the variable resistance of the resistor bank.

2. The device as recited in claim 1, wherein each of the at least one switching devices is an alternating current (AC) switch.

3. The device as recited in claim 2, wherein the AC switch is rated to carry a full, collector bus current for each phase continuously and to block some portion of a full, collector bus voltage for each phase.

4. The device as recited in claim 2, wherein the AC switch is selected from the group comprising silicon-controlled rectifiers, break-over diodes, and one or more levels of thyristors pairs.

5. The device as recited in claim 1, wherein the resistor bank includes a plurality of resistors in parallel, which, in combination, provides an effective total resistance to provide the full collector bus voltage during the low-voltage, grid fault occurrence.

6. The device as recited in claim 5, wherein a switching device is structured and arranged in series with each of the plurality of resistors.

7. The device as recited in claim 6, wherein the switching device associated with each of the plurality of resistors can be open or closed for all or some portion of each half-cycle based on the gating signal received from the controller.

8. The device as recited in claim 7, wherein the controller is structured and arrange to provide gating signals to the switching device associated with each of the plurality of resistors, and the gating signals include phase delay angles that open or close the switching device.

9. The device as recited in claim 8, wherein the controller is structured and arranged to open and close the switching device associated with each of the plurality of resistors to provide a resistance to maintain the collector bus voltage at or above a threshold voltage level.

10. The device as recited in claim 9, wherein the controller is structured and arranged to transmit gating signals to N+1 switching device associated with each of the plurality of resistors (where n is a positive integer), n switching devices of which are either open or closed for the entire half-cycle and an $N+1^{th}$ switching device is open for a first portion of the half-cycle and closed for a second portion of the half-cycle.

11. The device as recited in claim 9, wherein the threshold voltage level is a minimum voltage that prevents the at least one wind turbine generator from tripping.

12. The device as recited in claim 1, wherein the controller provides gating signals at half-cycle intervals.

13. The device as recited in claim 1, wherein the controller is structured and arranged to provide balanced voltages on the collector bus in each phase during an unbalanced low-voltage, grid fault occurrence on the load.

14. The device as recited in claim 1, the device further comprising a transient voltage protection device to protect the at least one switching device and the resistor bank from damage from high voltages.

15. The device as recited in claim 14, wherein the transient voltage protection device includes a plurality of RC snubber circuits and/or a plurality of arrestor devices.

16. The device as recited in claim 1, wherein the device further includes a cooling system for cooling the device during periods of peak heat generation.

17. The device as recited in claims 16, wherein the cooling system comprises a plurality of cooling blowers.

18. The device as recited in claim 1, wherein the device further includes a plurality of potential transformers to measure voltage levels in the device continuously and to provide voltage level data to the controller.

19. The device as recited in claim 1, wherein the device further comprises at least one current sensor to measure current levels in the device or on the collector bus continuously and to provide current level data to the controller.

20. The device as recited in claim 1, wherein the device further comprises a harmonic filter to minimize harmonic disturbances.

21. The device as recited in claim 1, wherein the controllable resistance is structured and arranged as a plurality of modules cascaded in series, each of the plurality of modules comprising a resistive element from the controllable resistor bank in parallel with one of the at least one switching device to provide a variable resistance.

22. A method of controlling collector bus voltage for at least one wind turbine generator when a low-voltage, grid fault occurrence on a utility power grid causes a voltage drop, the method comprising the steps of:
    providing a low-voltage fault ride-through device as recited in claim 1;
    measuring voltage levels on the collector bus continuously; and
    adjusting an operating state of the at least one switching device between an open state and a closed state, to pass collector bus current to the load, respectively, through the controllable resistor bank or through the at least one switching device to maintain the collector bus voltage levels above a predetermined threshold voltage level, to prevent one or more of the at least one wind turbine generator from tripping.

23. The method as recited in claim 22, the method further comprising
    measuring current levels in the low-voltage fault ride-through device continuously; and
    re-adjusting the opening state of the at least one switching device between the open state arid the closed state, to maintain the current level in the low-voltage fault ride-through device below a predetermined maximum allowable current.

24. A device for controlling voltage on a collector bus, the device being disposed between at least one wind turbine generator having an output with at least one phase and a utility grid point of common coupling (PCC) and the collector bus being in operational association with said at least one wind turbine generator, the device comprising:
    a controllable resistance that is disposed between the collector bus and the utility grid PCC of each phase of the output, the controllable resistance including:
        a controllable resistor bank to provide a variable resistance, wherein the resistor bank is structured and arranged to absorb real power generated by the at least one wind turbine generator when a low-voltage fault event occurs at the utility grid PCC and to maintain the voltage of the collector bus at or above a predetermined threshold voltage level, and
        at least one switching device in parallel with the controllable resistor bank, that passes collector bus current to the utility grid PCC when closed and that diverts collector bus current to the resistor bank when open; and
    a controller that is structured and arranged to receive current level and voltage level data and, based on current level and voltage level data, to provide gating signals to open or close the at least one switching device, to adjust the variable resistance of the resistor bank.

25. A device for controlling voltage on a collector bus, the device being disposed between two power sources and the collector bus being in operational association with one of the power sources, the device comprising:
    a controllable resistance that is disposed between the collector bus and the utility grid PCC of each phase of the output, the controllable resistance including:
        a controllable resistor bank to provide a variable resistance, wherein the resistor bank is structured and arranged to absorb real power generated by the at least one wind turbine generator when a low-voltage fault event occurs at the utility grid PCC and to maintain the voltage of the collector bus at or above a predetermined threshold voltage level, and
        at least one switching device in parallel with the controllable resistor bank, that passes collector bus current to the utility grid PCC when closed and that diverts collector bus current to the resistor bank when open; and
    a controller that is structured and arranged to receive current level and voltage level data and, based on current level and voltage level data, to provide dating signals to open or close the at least one switching device, to adjust the variable resistance of the resistor bank.

26. The device as recited in claim 25, wherein
    one of the two power sources is at least one wind turbine generator having an output with at least one phase;
    another of the two power sources is a utility grid point of common coupling (PCC); and
    the collector bus is in operational association with said at least one wind turbine generator.

* * * * *